(No Model.) 2 Sheets—Sheet 1.
W. W. ROSENFIELD.
INHALING AND VAPORIZING APPARATUS.
No. 266,530. Patented Oct. 24, 1882.
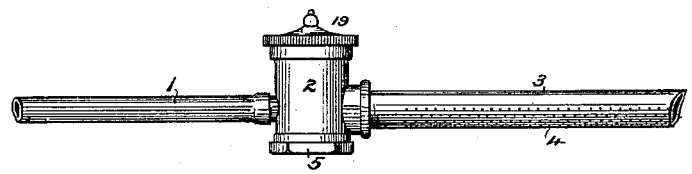
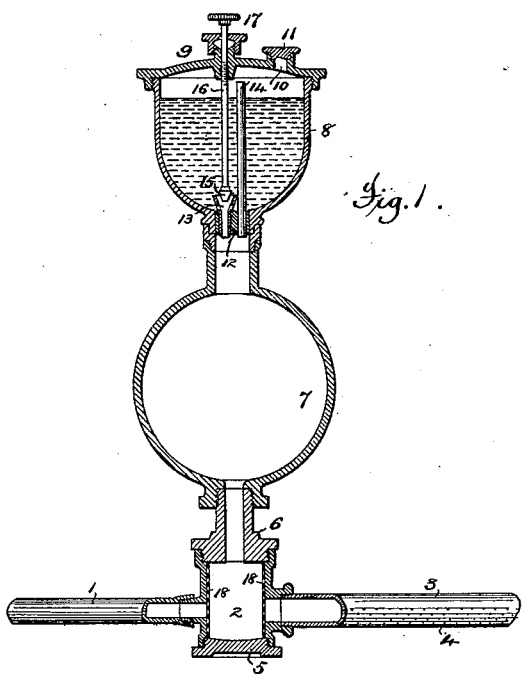

(No Model.) 2 Sheets—Sheet 2.
W. W. ROSENFIELD.
INHALING AND VAPORIZING APPARATUS.
No. 266,530. Patented Oct. 24, 1882.
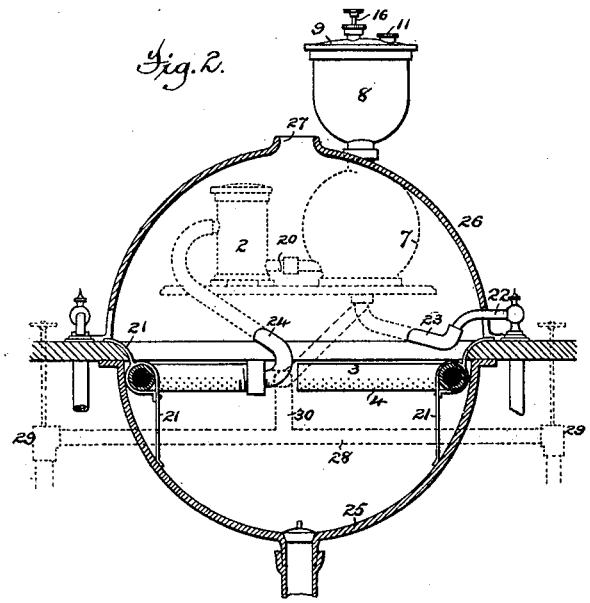
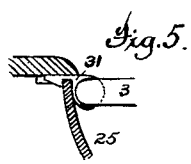
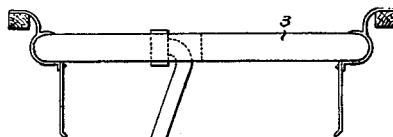
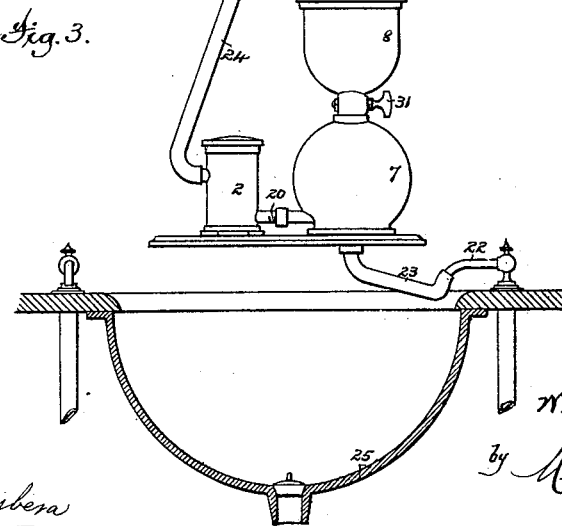
Attest:
Geo. H. Graham
Anthony N. Jasbena
Inventor,
Wm. W. Rosenfield,
by Munson & Philipp
Attys.

UNITED STATES PATENT OFFICE.

WILLIAM W. ROSENFIELD, OF NEW YORK, N. Y., ASSIGNOR, BY MESNE ASSIGNMENTS, TO THE PORTABLE HYGIENIC VAPOR AND DISINFECTOR COMPANY, OF SAME PLACE.

INHALING AND VAPORIZING APPARATUS.

SPECIFICATION forming part of Letters Patent No. 266,530, dated October 24, 1882.

Application filed April 22, 1882. (No model.)

*To all whom it may concern:*

Be it known that I, WILLIAM W. ROSENFIELD, a citizen of the United States, residing in the city of New York, county of New York, and State of New York, have invented certain new and useful Improvements in Inhaling and Vaporizing Apparatus, fully described and represented in the following specification and the accompanying drawings, forming a part of the same.

It is frequently desirable, especially during or after sickness, to fumigate houses or rooms for the purpose of purifying them and preventing contagion. This can be most effectively done by the use of a vapor tinctured with or carrying some disinfectant, as a vapor is the only vehicle which is capable of carrying such disinfectant into all the parts and intertices of the building or room. The same principle is adopted in the treatment of various diseases—such as catarrh, diphtheria, and the like—where the patient is required to inhale a vapor containing or tinctured with some substance which it is desired to apply to the diseased parts.

The present invention relates to an apparatus which is designed and adapted to produce a vapor for these and analogous purposes, which shall be tinctured with or contain the disinfectant, or the substance possessing the medicinal property required. This vapor is produced in the present invention by causing hot water to commingle or pass in contact with such disinfectant or medicinal matter, and then converting the water so medicated into vapor, which vapor can be inhaled or allowed to permeate the house or room. The apparatus by which this is accomplished is so constructed as to be capable of connection with the hot-water spigot or cock of any ordinary bath-tub or stationary wash-bowl.

The principal feature of the invention consists in an apparatus for feeding liquids against the pressure of a column of liquid or gas; but the invention also embraces certain minor features of construction, both singly and in various combinations, as will be hereinafter fully explained and pointed out.

In said drawings, Figure 1 is a sectional elevation, showing the structure of the feeding apparatus. Fig. 2 is a like view, showing the invention embodied in a slightly different form, and applied to an ordinary stationary washbowl, so as to form an inhaling as well as a vaporizing apparatus. Fig. 3 is a like view, showing the vapor-generating apparatus located in a different position. Figs. 4 and 5 represent modifications to be hereinafter referred to.

When it is desired that the apparatus shall be capable of medicating the vapor generated with either a solid or a liquid substance it will be constructed as shown in Figs. 1, 2, and 3.

Referring now particularly to Fig. 1, it will be observed that the hot-water pipe communicates through the flexible connection 1 with a receptacle, 2, which in turn communicates with the pipe 3, provided with a large number of small perforations, 4. The bottom of the receptacle 2 is closed by a screw-cap, 5, which, upon being removed, permits the solid substance with which the vapor is to be medicated to be placed in the receptacle, after which the cap is restored to position.

To the upper end of the receptacle 2 there is attached by means of a screw-connection, 6, an air-chamber, 7, to the top of which is attached a liquid-receptacle, 8, of a size equal to or somewhat smaller than the air-chamber. The top of the receptacle 8 is hermetically sealed by means of the screw-cap 9, or otherwise, said top being provided with a small aperture, 10, closed by a screw-cap, 11, which can be removed for the introduction of the liquid. The passage between the air-chamber and the liquid-receptacle is closed by a suitable stopper, 12, which is perforated to receive the seat 13 of the valve 15 and the air-tube 14. The valve 15 is operated by a rod, 16, which is screw-threaded and extends through a nut formed in the cap 9, its passage being made air-tight by a suitable stuffing-box, 17.

When the vapor is to be medicated with a solid substance such substance will be placed in the receptacle 2, it being prevented from passing into the pipes 1 3 by the gauze lining 18 of the receptacle, and the hot water will be permitted to pass from the pipe 1 through the receptacle into the pipe 3. In such passage some of the substance will be taken up by the water, which will thus become medicated. After passing into pipe 3, the water will be forced outward through the small perforations 4 in a series of fine jets, which jets of water, upon coming into contact with the air, will be almost entirely converted into vapor. The vapor thus generated will of course be medicated with the substance contained in the water. Vapor can thus be readily produced in any desired quantity, and in almost any room of an ordinary house, and can be permitted to fill the room or even the entire house, when desired.

In Fig. 4 an apparatus is shown which is adapted to act with solids only, the air-chamber and liquid-receptacle being removed and the upper end of the receptacle 2 closed by a cap, 19.

When the vapor produced is to be medicated with a liquid substance such substance will be placed in the receptacle 8, and the valve 15 will be raised to an extent sufficient to permit the liquid to flow out as fast as may be desired.

It will readily be seen that when the water is admitted into the receptacle 2 its head or pressure would cause it to rise and mingle with the liquid in the receptacle 8 were it not for the body of air confined in the chamber 7. This body of air, as it cannot escape, will, however, effectually prevent the rise of the water, and thus keep the liquid in the upper receptacle entirely isolated. It will readily be understood that as soon as the liquid in the receptacle 8 commences to pass out its surface will be lowered, thus causing the air contained in the receptacle above it to expand, whereby its pressure will be so reduced that unless compensated for the pressure of the air from below will soon stop the flow of the liquid. This difficulty is overcome and an equilibrium in the pressure of the air above and below the liquid maintained by means of the tube 14, which is of sufficient length to reach above the surface of the liquid, and thus afford a free communication between the chamber 7 and the air above the liquid in the receptacle 8. From this it results that there is no pressure from below to resist the flow of the liquid and prevent it from passing freely downward to mingle with the water, the rapidity of its downward flow being governed by the position of the valve 15. As before stated, the chamber 7 should be as large as or somewhat larger than the receptacle 8, so that sufficient air can pass from it to fill said receptacle without permitting the water to rise above the valve-seat 13.

It is to be remarked that it is not necessary that the tube 14 should be upon the interior of the receptacle 8. It may be upon the outside and so located as to pass through the walls of the chamber 7 and the receptacle 8 above the surface of the liquid in the latter.

In Fig. 2 the invention is shown as embodied in a different form and used in connection with an ordinary stationary wash-bowl, as 25, so as to form an inhaling as well as a vaporizing apparatus. In this case the air-chamber 7, instead of being placed above the receptacle 2, is located at one side, the two being connected by a short pipe, 20. The apparatus thus organized is supported in any convenient position near the wash-bowl, and the perforated pipe 3, bent to an annular form, is, by any convenient form of bearing, as 21, loosely supported in or just above the bowl. In this case the hot-water spigot 22 is connected by a flexible pipe, 23, with the air-chamber 7, and the perforated pipe 3, by a like pipe, 24, is connected with the receptacle 2. The parts being thus connected and the spigot 22 turned so as to allow the hot water to flow, the operation of the apparatus will be the same as already set forth in connection with Fig. 1.

When it is desired to inhale the vapor the bowl will be provided with a cover, 26, having a suitably-shaped aperture, 27, above which the patient can hold his face, so as to draw the vapor into his mouth or nostrils.

If it should at any time be desired to medicate water for bathing with any substance, it can be readily done with this apparatus by connecting the pipe 23 to the hot or cold spigot, according to which is desired, and disconnecting the pipe 24 from the pipe 3, so as to allow the water to run freely into the bowl or tub.

If it is desired to arrange the apparatus so that it can be used independently of the spigots, it can be done by connecting the hot and cold water pipes by a cross-pipe, as 28, controlled by cocks, as 29, and provided with a branch, as 30, all as shown in dotted lines in Fig. 2, to which the pipe 23 can be connected.

The pipe 3 may, if desired, be permanently attached to the bowl by a series of brackets, 31, as shown in Fig. 5.

When the production of vapor for disinfecting purposes is all that is desired the position of the pipe 3 is not material. One convenient position is that shown in Fig. 3, in which it is shown as removed from the bowl and supported upon brackets. When in this position it can be also used for administering a shower or spray bath. When the pipe 3 is so located that its drippings cannot be caught by the wash-bowl or bath-tub it will of course be necessary to provide a suitable trough or dish for that purpose.

In the structure shown in Fig. 3 the valve and valve-rod 15 16 are dispensed with and a stop-cock is used to control the passage between the air-chamber 7 and the liquid-receptacle 8 to regulate the feed of the liquid.

The feeding apparatus herein shown and described will also be found well adapted for many other purposes when it is required to feed a liquid against the pressure of a liquid or a gas—as, for example, in supplying oil to the pistons and valves of pumps, engines, &c., against the pressure of the steam.

What I claim is—

1. The combination, with the closed liquid-receptacle 8, of the air-chamber 7, of a size substantially equal to or greater than that of the liquid-receptacle, the two being connected by a passage, as described, and a pipe, as 14, affording free communication between the latter and the air above the liquid in the former, substantially as described.

2. The combination, with the closed liquid-receptacle 8, of the air-chamber 7, of a size substantially equal to or greater than that of the liquid-receptacle, the pipe, as 14, connecting the latter with the former at a point above the surface of the liquid, and means for regulating the flow of the liquid, substantially as described.

3. The combination, with the induction-pipe 1 and the perforated discharge-pipe 3, of the medicating apparatus, substantially as described.

4. The combination, with the induction-pipe and the perforated discharge-pipe, of the medicating apparatus, consisting of the receptacle 2, the air-chamber 7, and the liquid-receptacle 8, and their connections, substantially as described.

5. The combination, with the induction-pipe and the perforated discharge-pipe, of the medicating apparatus, substantially such as described, and the receptacle for receiving the drippings from said perforated discharge-pipe, provided with a cover, as 26, having an opening, as 27, substantially as described.

In testimony whereof I have hereunto set my hand in the presence of two subscribing witnesses.

WM. W. ROSENFIELD.

Witnesses:
ANTHONY N. JASBERA,
COLERIDGE A. HART.